United States Patent [19]

Mayhew et al.

[11] Patent Number: 4,610,559
[45] Date of Patent: Sep. 9, 1986

[54] SHIELD FOR UNIVERSAL JOINT

[75] Inventors: Roger D. Mayhew, Fredonia; B. Bennett Reak, West Bend, both of Wis.

[73] Assignee: Weasler Engineering, Inc., West Bend, Wis.

[21] Appl. No.: 722,341

[22] Filed: Apr. 12, 1985

[51] Int. Cl.⁴ .......................... F16B 11/00; F16D 3/00
[52] U.S. Cl. .......................................... 403/23; 403/58; 464/171; 464/173
[58] Field of Search .................. 403/50, 51, 57, 58, 403/134, 23; 464/171, 173, 172, 117, 118

[56] References Cited

U.S. PATENT DOCUMENTS

| | | | |
|---|---|---|---|
| 919,651 | 4/1909 | Spicer | 403/58 |
| 1,968,925 | 8/1934 | Barish | 464/173 |
| 2,616,728 | 11/1952 | Pitt | 403/51 |
| 3,551,013 | 12/1970 | Trojanowski et al. | 464/171 |

Primary Examiner—Cornelius J. Husar
Assistant Examiner—Peter M. Cuomo
Attorney, Agent, or Firm—Quarles & Brady

[57] ABSTRACT

A shield for a universal joint having two yokes is disclosed. Each one of a pair of opposed bell elements is journaled upon the yokes and has a hemispherically shaped outer surface. Each one of a pair of frusto-spherically shaped shoes slidably overlaps one of the bell elements so that the shoes are restrained against axial movement but can rotate relative to the bell elements. A boot spans the shoes with each shoe rotatably disposed between its associated bell element and the boot. The shoes float upon the bell elements within the boot to fully enclose the universal joint as the joint is articulated. The small range of motion of the shield makes it especially suited to operate at wide angles in compact spaces.

2 Claims, 5 Drawing Figures

SHIELD FOR UNIVERSAL JOINT

BACKGROUND OF THE INVENTION

The present invention relates to universal joints and more particularly, to a shield for a universal joint.

Universal joints have found wide application to couple rotary shafts that have an angular misalignment. For example, a double universal joint is often used to couple the power take-off shaft of a mobile prime mover such as a tractor to the power input shaft of an attached implement. Since the implement can pivot relative to the prime mover, the drive line from the prime mover to the implement must also be pivotal. The universal point provides such an articulated coupling between the power take-off and power input shafts.

The prior art has recognized the dangers of exposed universal joints in drive lines of the type described. Shields for universal joints are therefore also well known. Prior art shields are usually provided in two halves. One half of the shield is usually fixed or journaled upon a rotating member of the drive line and the other half of the shield is stationary, being fixed to either the prime mover or to the implement. Due to the limited amount of space that is available for the shield on the prime mover or the implement, the rotating shield often interferes with the stationary shield when there is a wide angle between the drive and driven shafts. To avoid this interference, users commonly remove the shield on the prime mover or implement. Of course, this exposes about half of the universal joint thereby creating a dangerous condition.

Some prior art shields are mounted to rotating members of the drive line and fully enclose the universal joint. However, these fully enclosed shields are only capable of relatively small bending angles. Therefore, a need exists for a fully enclosed shield for a universal joint which is capable of wide bending angles.

SUMMARY OF THE INVENTION

The invention provides a shield for a universal joint having two yokes. A pair of opposed bell elements have hemispherically shaped outer surfaces, with each bell element being suitable to be mounted co-axially with one of the yokes. Each one of a pair of frusto-spherically shaped shoes slidably overlaps one of the bell elements to restrain the shoe from axial movement but to allow the shoe to rotate relative to the bell element. A boot is suitable to span the shoes with each shoe rotatably disposed between its associated bell element and the boot. The shoes float upon the bell elements within the boot as the universal joint is articulated. This arrangement results in a shield which is fully enclosed and can operate at wide angles within a small space.

In another aspect of the invention, each bell element is concentric with its corresponding shoe with a center which is outward of the intersection of the axes of the adjacent cross-link of the universal joint along the axis of the adjacent yoke. Therefore, as the yokes become skewed, the centers of the bell elements and corresponding shoes move longitudinally relative to the boot. To allow for this movement, the boot can slide longitudinally a short distance relative to the shoes. When the boot rotates with the shield, centrifugal force causes the boot to center itself on the shoes.

In another aspect of the invention, each shoe is rotatable relative to its adjacent bell element both about the longitudinal axis of the shoe and about the radial axes of the shoe. The capability of each shoe to rotate about its longitudinal axis allows the shoes to slow down relative to the bell elements when someone contacts the shield as it rotates with the joint.

In another aspect, each shoe is rotatable relative to the boot both about the longitudinal axis of the shoe and about the radial axes of the shoe. As explained in the previous paragraph, this feature enables the boot to slow down relative to the shoes should someone bump the boot as it rotates with the joint.

It is therefore a primary object of the invention to provide a fully enclosed shield for a universal joint.

It is another object of the invention to provide a fully enclosed shield for a wide angle universal joint.

It is another object of the invention to provide a shield for a universal joint which can operate at wide angles in a small space.

These and other objects and advantages of the invention will become apparent from the following detailed description and from the drawings.

DETAILED DESCRIPTION OF THE PREFERRED EMBODIMENT

Figure 1:
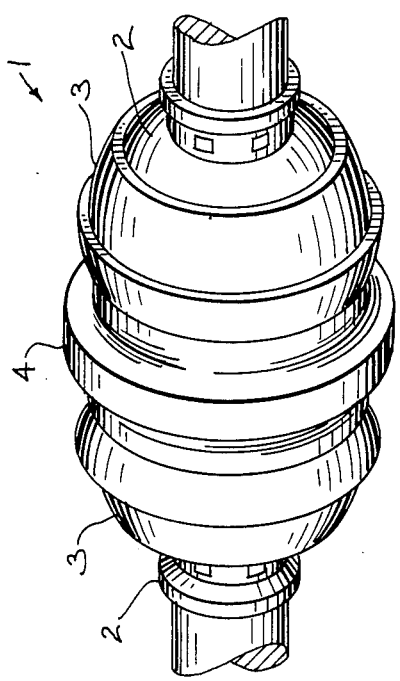
FIG. 1 is a perspective view of an assembled shield of the present invention shown enclosing a universal joint.
Figure 2:
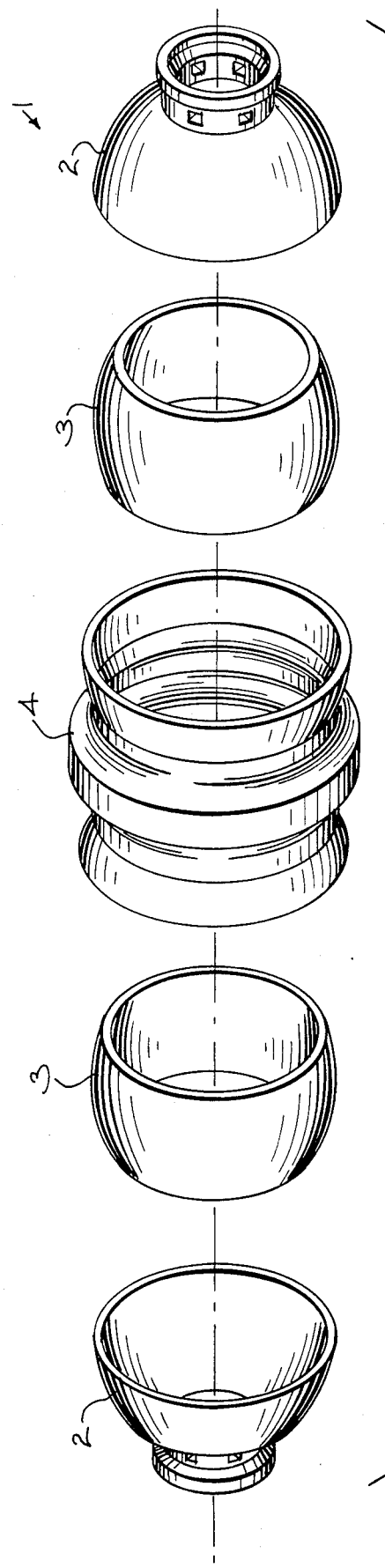
FIG. 2 is an exploded perspective view of the shield alone.

The invention provides a shield to fully enclose a universal joint and which is capable of operating at wide angles in a compact space to avoid interference with other shields provided on prime movers and on implements. Referring to FIGS. 1 and 2, a shield 1 of the invention includes a pair of bell elements 2, a pair of shoes 3, and a boot 4. The bell elements 2, the shoes 3 and the boot 4 are preferably molded from a lightweight, stiff and lubricious plastic material such as polyethylene. However, the components of the shield could also be made of other suitable materials.

Figure 3:
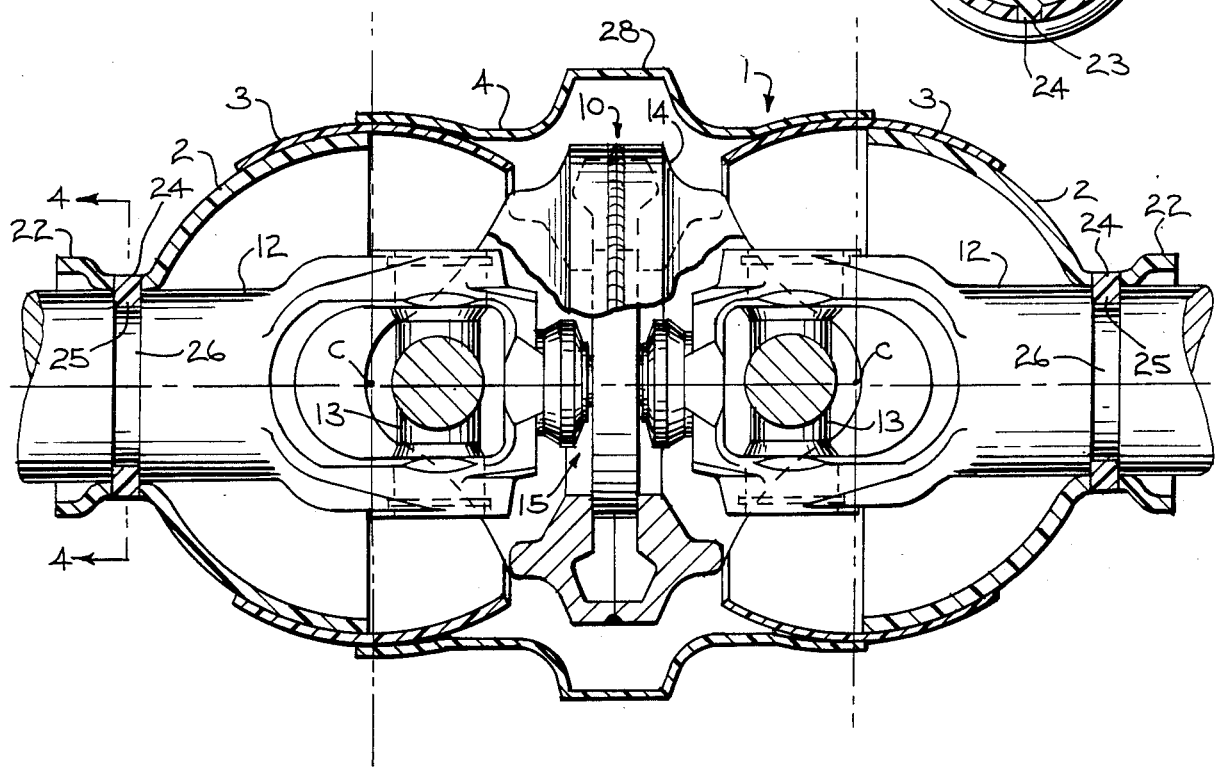
FIG. 3 is a plan view in section illustrating the shield of FIG. 1 enclosing a double universal joint wherein the longitudinal axes of the joint are aligned.

To realize the full potential of the invention, the shield is preferably used with a universal joint which is capable of wide bending angles such as a double universal joint. Such a double universal joint 10 is shown in FIG. 3 together with the shield 1. The universal joint 10 includes a pair of outer yokes 12 which are pivotally connected by cross-links 13 to a double inner housing 14 in a manner which is well known in the art. The universal joint 10 also includes a centering apparatus 15 which is fully described in the co-pending U.S. Patent application for "Centering Apparatus for Constant Velocity Universal Joint" invented by Roger D. Mayhew and filed on Dec. 10, 1984. Note, however, that a shield of the invention could be used with other types of universal joints.

Figure 4:
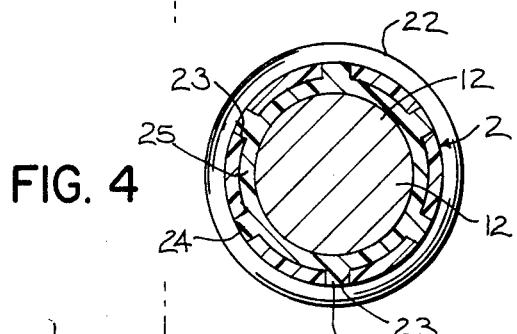
FIG. 4 is a sectional view along the plane of the line 4—4 of FIG. 3.

Each one of the bell elements 2 is mounted adjacent to one end of the joint 10 coaxial with the adjacent outer yoke 12. The bell elements are journaled on the adjacent outer yoke 12 and open toward the joint 10. Referring also to FIG. 4, each bell element 2 has an opening at its outward end surrounded by a flange 22 and through which the corresponding outer yoke 12 extends. The flange 22 has apertures 23 to receive ears 24 of a bearing 25. The bearing 25, which is preferably a suitable plastic such as nylon, rides within a peripheral groove 26 formed in the yoke 12. As the joint 10 is rotated, the shield 1 normally rotates with the joint due to the friction within the bearing 25 and the friction of the various parts of the shield relative to each other. However, if the shield 1 is engaged by someone contacting it, the bearings 25 allow the shield 1 and particularly the bell elements 2, to slow down or stop rotating.

The shoes 3 have frusto-spherically shaped inner and outer surfaces. Each shoe 3 slidably overlaps the adjacent bell element 2 and is concentric therewith, both having centers at C, to restrain the shoe 3 from axial movement relative to the bell element 2. However, each shoe 3 is rotatable relative to its respective bell element 2. In the preferred embodiment, each shoe 3 is rotatable about its longitudinal axis as well as being infinitely rotatable (floatable) about its radial axes, with respect to the bell element 2. While rotation about the longitudinal axis of each shoe is not required to practice the invention, this rotational capability provides an added measure of safety by allowing the shoes 3 to slow down relative to the bell elements 2 should the shield be bumped by someone while it is rotating.

The boot 4 spans the shoes 3 and journals the shoes so that each shoe can rotate between its associated bell element 2 and the boot 4. The contour of the center portion 28 of the boot 4 follows the shape of the double inner housing 14 to provide clearance with the housing 14 in extreme positions of operation. The boot 4 overlaps the shoes 3 and has frusto-spherically shaped inner surfaces of a diameter about equal to the outer diameter of the shoes 3 adjacent to its outer ends but not beyond the vertical diametral planes indicated by the lines A—A in FIG. 5. Outward from the diametral planes indicated by the lines A—A, the inner surfaces of the ends of the boot 4 are circular cylindrical. This arrangement allows each shoe 3 to move a short distance $d_1$ axially with respect to the boot 4 as the joint is articulated. This distance $d_1$ is the longitudinal distance that each center C moves as the shield moves from the position of FIG. 3 to the position of FIG. 5. Although the boot 4 is axially movable a short distance relative to the shoes 3 when the shield is stationary in the position of FIG. 3, centrifugal force causes the boot to ride on the radially outer-most surfaces of the shoes so that the boot tends to center itself with respect to the shoes 3 when the shield is rotating with the joint.

As with the connection between the bell elements 2 and the shoes 3, the connection between the shoes 3 and the boot 4 allows rotation of each shoe 3 relative to the boot 4 about the longitudinal axis of the shoe and allows the shoe to float about its radial axes relative to the boot. Again, although relative rotation between the boot 4 and each shoe 3 about the longitudinal axis of the shoes is not required to carry out the invention, such rotational capability provides extra safety as it allows the boot 4 to slow down relative to the shoes 3 should someone bump the boot while it is rotating.

Figure 5:
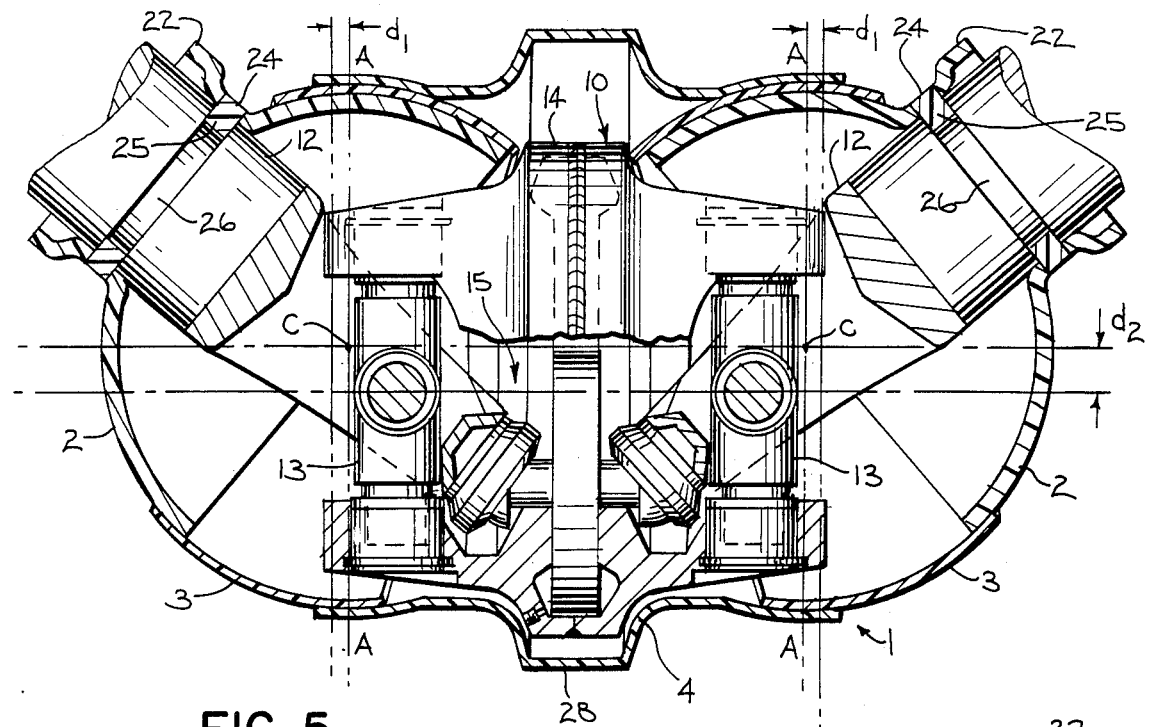
FIG. 5 is a view similar to FIG. 3 but showing the shield and joint in an extreme angular position.

Referring to FIG. 5, it is shown that the shield 11 remains fully enclosed even in the extreme positions of articulation of the joint 10. As the rotating joint 10 and shield 1 are articulated from the position of FIG. 3 to the position of FIG. 5, the inner ends of the shoes 3 abut the double inner housing 14 and float about a radial axis relative to the bell elements 2 and relative to the boot 4. As the skewed joint 10 and shield 1 of FIG. 5 rotates, the shoes 3 are constantly floating about their radial axes with respect to the bell elements 2 and with respect to the boot 4. The arc subtended by each shoe 3 is large enough to maintain the shield fully enclosed in all possible relative positions of the bell elements 2, the shoes 3 and the boot 4. However, the shoes 3 are small enough to not limit the angular capability of the joint 10.

As mentioned above, each center C moves a distance $d_1$ longitudinally as the shield moves from the position of FIG. 3 to the position of FIG. 5. In addition, each center C moves a distance $d_2$ radially as the shield is moved from the position of FIG. 3 to the position of FIG. 5. The position of the center C changes because each center C is spaced a short distance outward from the intersection of the axes of the adjacent cross-link 13 along the axis of the adjacent outer yoke 12. The spacing of each center C outward from the intersection of the axes of the adjacent cross-link 13 allows each shoe 3 to have sufficient overlap in the longitudinal direction.

Although the yokes 12 in the FIG. 5 have moved through about 80° relative to one another from the position of FIG. 3, the distance $d_2$ is relatively small. Therefore, the radially outer dimensions of the shield can be made relatively small and the range of motion of the shield as it is articulated will be small. The closer into the intersection of the axes of the adjacent cross-link 13 that each center C can be placed along the axis of the adjacent yoke 12, the smaller that the distance $d_2$, and also the distance $d_1$, will be. Therefore, each center C is preferably as close as possible to the axis of the adjacent cross-link 13.

Since the distance $d_2$ is relatively small, the shield 1 can operate through a wide angular range within a small space. Where prior art shields would interfere with shields or other parts provided on prime moves and implements, a shield of the present invention will not. Therefore, users are less inclined to remove shields or other parts from the prime movers or implements to provide clearance for a shield of the invention.

Many modifications and variations to the preferred embodiment will be apparent to those skilled in the art which will still embody the invention. Therefore, it is not intended that the invention be limited by the scope of the foregoing description or drawings, but only by the claims which follow.

I claim:

1. In a double universal joint having two yokes pivotally connected by respective cross-links to a double inner housing, a shield comprising:
   a pair of opposed, hemispherically shaped bell elements opening toward the joint, each of said bell elements being axially fixed to one of said yokes and having a center spaced-apart from the center of the other bell element;
   a pair of frusto-spherically shaped shoes, each of said shoes slidably overlapping one of said bell elements and being concentric therewith;
   a boot spanning said shoes with each shoe being rotatably disposed between its associated bell element and said boot, said boot being solely supported by the shoes and free to rotate independent of the joint; and
   wherein said shoes float upon said bell elements within said boot to fully enclose the universal joint as the joint is articulated.

2. A shield is in claim 1, wherein the center of each bell element and corresponding shoe is outward of the intersection of the axes of the adjacent cross-link along the axis of the adjacent yoke and the shoes move axially outward with respect to the boot as the joint is articulated.

* * * * *

UNITED STATES PATENT AND TRADEMARK OFFICE
CERTIFICATE OF CORRECTION

PATENT NO. : 4,610,559            Page 1 of 2

DATED : September 9, 1986

INVENTOR(S) : Roger D. Mayhew and B. Bennett Reak

It is certified that error appears in the above-identified patent and that said Letters Patent is hereby corrected as shown below:

The following References cited should be added to the cover page:

U.S. PATENT DOCUMENTS

| Number | Date | Name | Class |
|---|---|---|---|
| 2,106,672 | 1/1938 | Wollner | 64/21 |
| 2,133,176 | 10/1938 | Parent | 64/17 |
| 2,574,226 | 11/1951 | Sampson | 64/21 |
| 2,924,954 | 2/1960 | Panhard | 64/9 |
| 3,357,206 | 12/1967 | Christie | 64/6 |
| 3,418,828 | 12/1968 | Carns | 64/32 |
| 3,462,975 | 8/1969 | Skromme et al | 64/32 |
| 3,498,082 | 3/1970 | Geisthoff et al | 64/32 |
| 3,504,508 | 4/1970 | Bornzin | 64/3 |
| 3,747,368 | 7/1973 | Morin | 64/21 |

FOREIGN PATENT DOCUMENTS

| Number | Date | Country | Class |
|---|---|---|---|
| 228,059 | 11/1910 | West Germany | |
| 996,629 | 9/1951 | France | 464/118 |
| 1,102,501 | 11/1961 | West Germany | |

UNITED STATES PATENT AND TRADEMARK OFFICE
CERTIFICATE OF CORRECTION

PATENT NO. : 4,610,559

DATED : September 9, 1986

INVENTOR(S) : Roger D. Mayhew and B. Bennett Reak

It is certified that error appears in the above-identified patent and that said Letters Patent is hereby corrected as shown below:

The following References cited should be added to the cover page:

OTHER DOCUMENTS

Engineering drawing of Weasler Engineering, Inc., P.O. Box 558, West Bend, Wisconsin, 53095, admitted prior art, (Applicant's Exhibit N).

In column 1, line 14, change "point" to --joint--.

Signed and Sealed this

Second Day of December, 1986

*Attest:*

DONALD J. QUIGG

*Attesting Officer*     *Commissioner of Patents and Trademarks*